Sept. 3, 1963 W. E. SHENK 3,102,943
HIGH FREQUENCY ROTARY WELDING TRANSFORMER
Filed Jan. 13, 1960 4 Sheets-Sheet 1

INVENTOR
WILLIAM E. SHENK

BY *Francis J. Klempay*
ATTORNEY

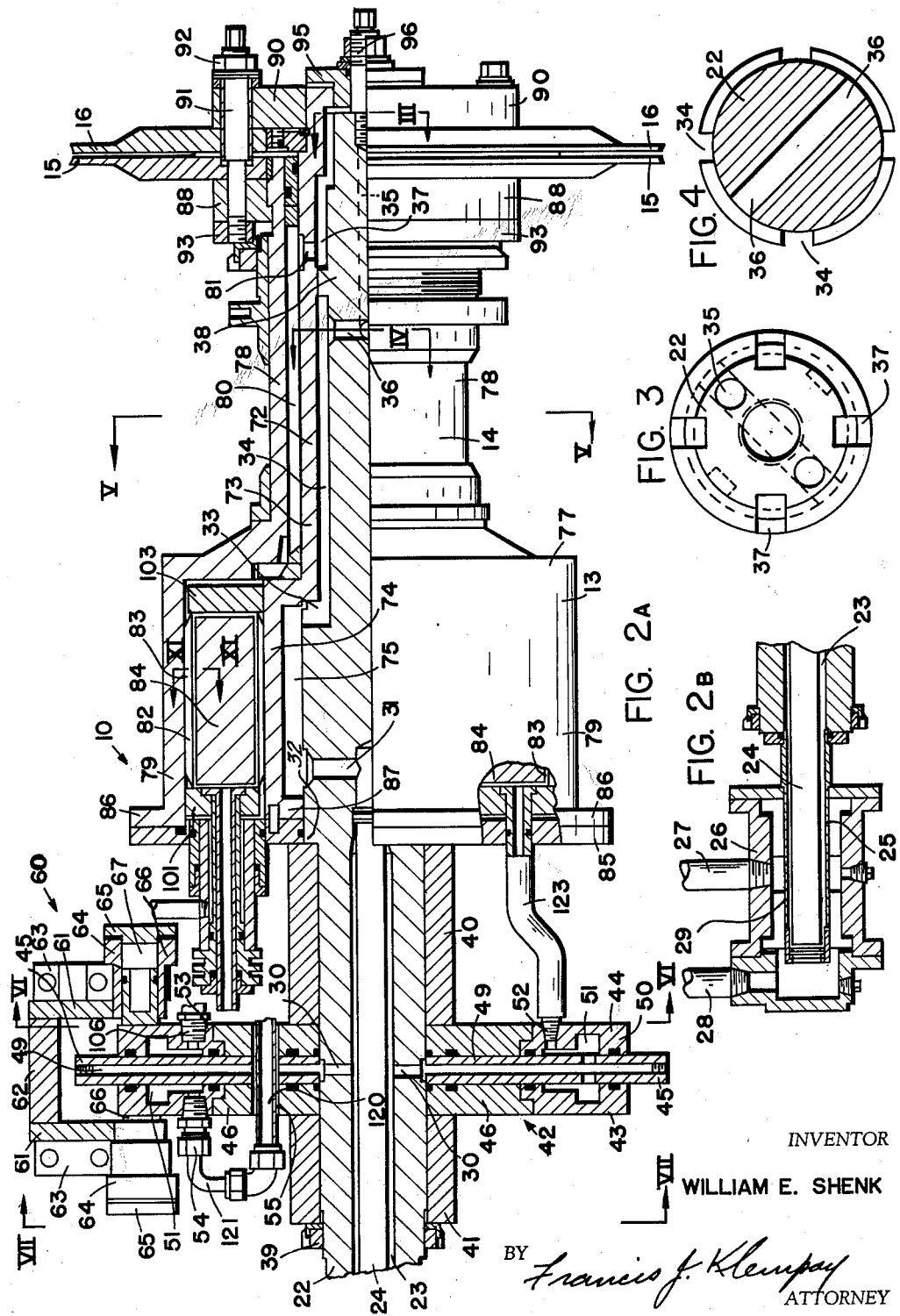

INVENTOR
WILLIAM E. SHENK
BY Francis J. Klempay
ATTORNEY

Sept. 3, 1963 W. E. SHENK 3,102,943
HIGH FREQUENCY ROTARY WELDING TRANSFORMER
Filed Jan. 13, 1960 4 Sheets-Sheet 4
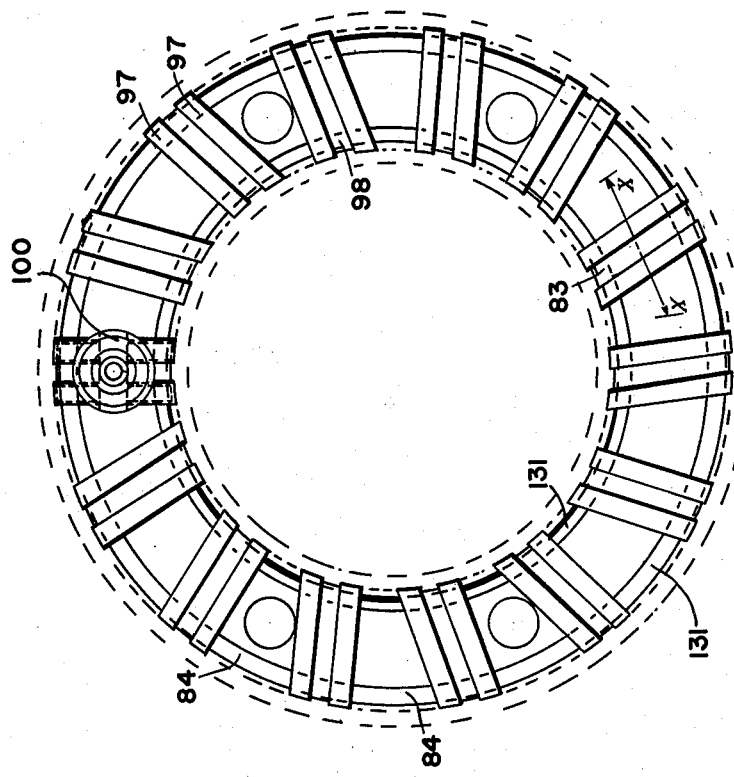
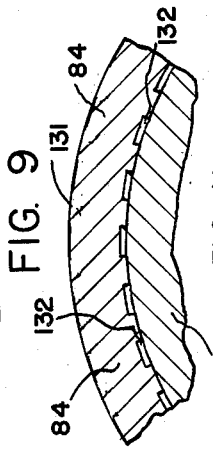
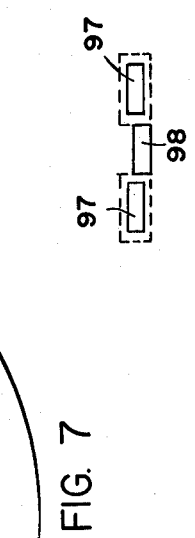
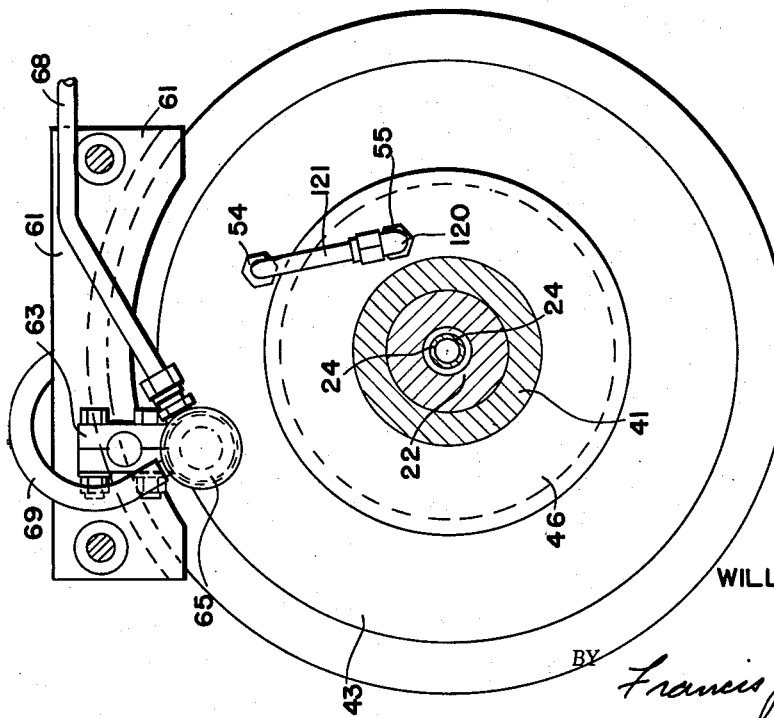
INVENTOR
WILLIAM E. SHENK
BY *Francis J. Klempay*
ATTORNEY United States Patent Office 3,102,943
Patented Sept. 3, 1963

3,102,943
HIGH FREQUENCY ROTARY WELDING TRANSFORMER
William E. Shenk, Hubbard, Ohio, assignor to The McKay Machine Company, Youngstown, Ohio, a corporation of Ohio
Filed Jan. 13, 1960, Ser. No. 2,238
12 Claims. (Cl. 219—63)

The present invention relates generally to the welding art and more particularly to welding apparatus of the type used to heat and fuse an axially extending seam cleft in a cylindrical tube length formed from metal strip in a continuous manner. The present invention seeks to provide a highly improved rotary transformer which, although not strictly limited thereto, is ideally adapted for welding operations wherein high frequency alternating currents are employed.

Welding transformers of the type having primaries and secondaries mounted for rotation with the secondaries being connected to rotating welding electrode wheels that engage the opposite edges of a cylindrical tube length are well known in the art as is evidenced by my issued U.S. Patent No. 2,616,016, entitled "Rotary Electric Resistance Welder," which is assigned to the assignee of the present invention. The use of high frequency welding currents is also known in the art and, in accordance with prior art practice, the high frequency currents are either induced in the cylindrical tube length or are transferred thereto by a combination of conduction and induction. As will be understood, high frequency welding currents are widely employed in the fabrication of tubing from non-ferrous strip material, such as aluminum, for example, which is characterized by its low resistivity. While it has been previously suggested to provide a rotary transformer for use with high frequency alternating currents—as in the Caputo U.S. Patent No. 2,265,627—such prior art apparatus is unacceptable for the purposes intended and is extremely limited with respect to the range of frequencies which may be employed.

It is therefore the primary or ultimate object of the present invention to provide a rotary welding transformer which is ideally adapted for use in welding the opposite edges of a cylindrical tube length with high frequency alternating current. The construction and utilization of the rotary transformer is such that an almost unlimited range of frequencies may be employed. Upon proper engineering and design of a rotary transformer constructed in accordance with the teachings of this invention apparatus can be provided which will operate in a highly efficient manner at frequencies of millions of cycles per second.

Another object of the invention to provide a high frequency rotary welding transformer which embodies improved means for transferring the high frequency alternating electrical currents from the rotating current collector rings to the primary winding of the transformer. The high frequency currents which are at relatively large voltage potential differences are conducted from the current collector rings to the terminal connectors of the primary by means of concentric or co-axial conductors whereby the high potential fields normally surrounding the individual and separated conductors of prior art apparatus are eliminated. Such high potential fields cannot be tolerated and are undesirable in the high frequency apparatus of the present invention due to the substantial insulation and flash-over problems presented.

Still another object of the invention is to provide a high frequency rotary welding transformer that employs improved arrangements for cooling those parts which are subject to heavy current densities and thus generate substantial quantities of heat. As will be hereinafter more fully apparent, cooling passageways and conduits are provided whereby sufficient quantities of cooling fluid may be circulated to all portions of the welding transformer—including the primary and secondary, the current collector rings, the supporting shaft, etc.

It is yet another object of the invention to provide rotary apparatus of the kind described which embodies improved means for transferring the high frequency electrical currents from a stationary source thereof to the rotating transformer with a minimum of potential loss. Relatively stationary current conductive brushes engage the opposite side faces of the current conductive collector rings in an improved manner and these brushes are cooled by circulating cooling fluid therethrough.

Yet a further object of the invention is the provision in rotary apparatus of the character described of an improved circuit arrangement operative to electrically interconnect the welding transformer with the welding wheel electrodes. The disclosed arrangement is such that electrical resistance and reactance losses are materially reduced and maintained at a minimum but yet the assembly is of relatively small cross sectional area to facilitate the mounting thereof.

A further object of the invention is the provision of a high frequency rotary welding transformer of improved mechanical structure whereby the deflection and wear of the parts is kept to a minimum. In this manner the rotary transformer is adapted for sustained and continuous operations with a minimum of maintenance.

The above, as well as other objects and advantages, will become more apparent upon consideration of the following specification and accompanying drawing wherein there is disclosed a preferred illustrated embodiment of the invention.

In the drawing:

FIGURE 1 is a fragmentary side sectional view depicting a welding station in a continuous tube fabricating line employing a high frequency rotary welding transformer constructed in accordance with the teachings of the present invention;

FIGURE 2, composed of FIGURES 2A and 2B, is a side view, partially in section, showing the high frequencies rotary welding transformer of the present invention;

FIGURES 3 and 4 are end sectional views taken along the section lines III—III and IV—IV, respectively, of FIGURE 2A showing the construction of the elongated main supporting shaft;

FIGURES 5, 6 and 7 are end sectional views taken along the section lines V—V, VI—VI and VII—VII, respectively, of FIGURE 2A;

FIGURE 9 is an end view of the primary winding and the core of the welding transformer;

FIGURE 10 is an enlarged sectional view taken along the section line X—X of FIGURE 9; and FIGURE 11 is an end sectional view taken along the section line XI—XI of FIGURE 2A.

Figure 1:
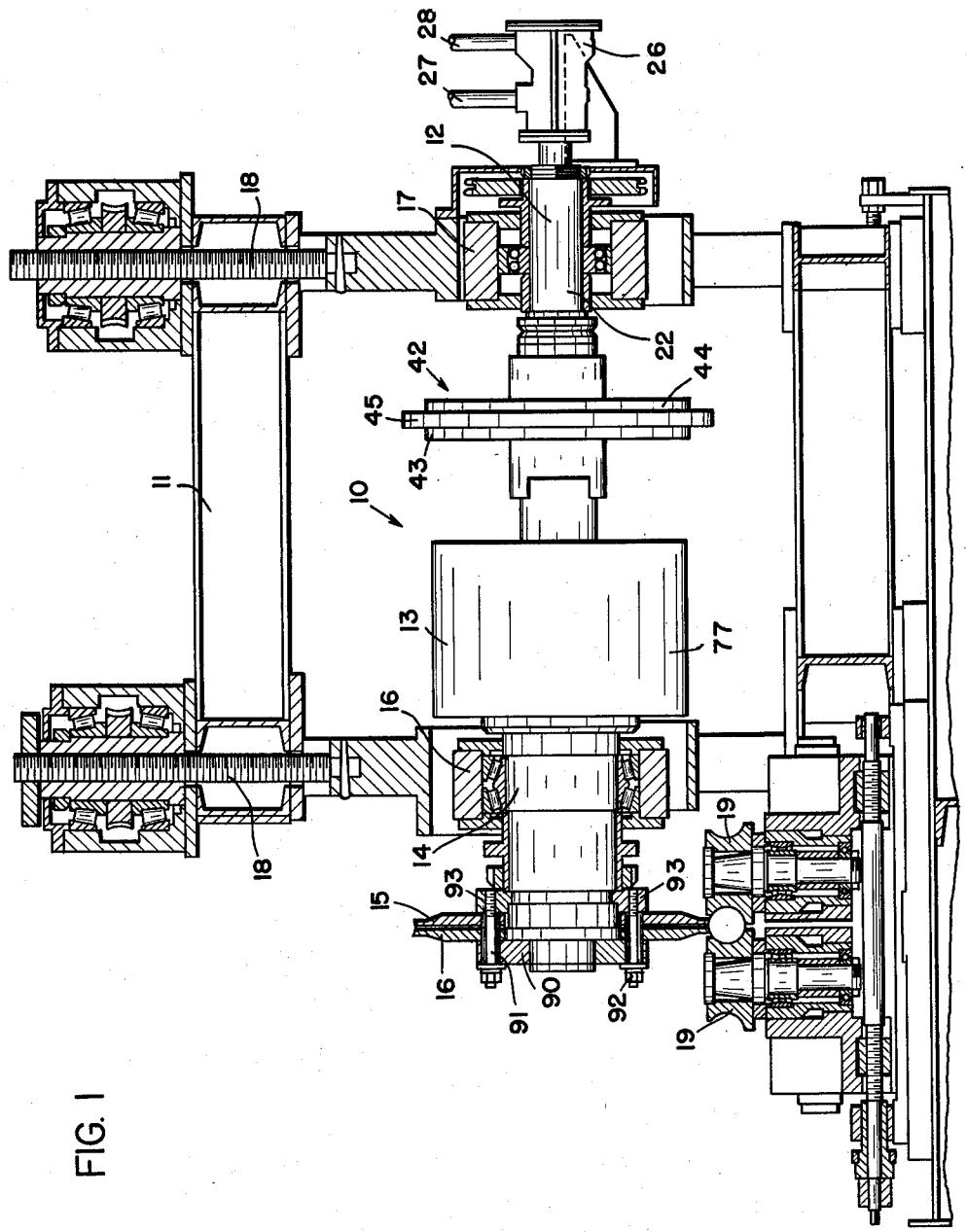

Referring now to the drawing, and initially to FIGURE 1 thereof, there is shown a high frequency rotary welding transformer, generally designated by the reference numeral 10, which is supported by a suitable housing 11. The high frequency rotary welding transformer comprises a rear bearing portion 12, a transformer portion 13 and a throat portion 14 and the arrangement is such that large high frequency electrical currents at relatively low potential differences and of opposite polarity are conducted to a pair of large welding electrode wheels 15 and 16 which, of course, are insulated from each other.

The high frequency rotary welding transformer is encircled at the throat portion 14 by a front bearing assembly 16 while the bearing portion 12 of the transformer is encircled and rotatably supported by a horizontally floating rear bearing assembly 17. The bearing assemblies 16 and 17 are mounted from the housing 11 and are vertically adjustable with respect thereto upon proper movement of the lifting screws 18. The disclosed arrangement is such that the relatively heavy and large high frequency rotary welding transformer is rotatably supported with the welding electrode wheels 15 and 16 disposed in overhanging relation with respect to a pair of pressure applying welding rolls 19 and a cylindrical tube length, not shown, passing therethrough. The welding electrode wheels 15 and 16 are adapted to contact the opposite side edges of a longitudinally extending seam cleft in the cylindrical tube length to heat and soften the same in a continuous manner. As the side edges of the seam cleft are heated and softened the pressure applying welding rolls 19 abut these edges under considerable pressure to complete the weld therebetween.

The high frequency rotary welding transformer comprises an elongated main supporting shaft 22 of steel or other suitably rigid material which carries the principal elements of the apparatus. The shaft 22 is machined to provide an axial bore 23 that extends for a portion of the length of the shaft 22. Received concentrically within the axial bore 23 is an elongated pipe 24 which projects rearwardly beyond the end of the supporting shaft 22. The axial bore 23 and the pipe 24 define a pair of concentric passageways for the flow of cooling fluid as will be hereinafter more fully explained.

A cup-like cover cap 25 is bolted to the rear end of the shaft 22 and extends about the projecting rear end of the pipe 24. Journaled on the outer end of the cup-like cover cap 25 is a rotary fluid coupling 26 which is adapted to be connected by an inlet conduit 27 and an outlet conduit 28 to a suitable source of cooling fluid, not shown. The inlet conduit 27 communicates with the passageway between the pipe 24 and axial bore 23 in the supporting shaft through a suitable aperture 29 provided in the side wall of the cup-like cover cap 25. The outlet conduit 28 effectively communicates with the axial opening in the pipe 24 as is clearly shown in the drawing.

The supporting shaft 22 is radially bored at a point adjacent the rear end thereof to provide a plurality of radially extending passageways 30. The passageways 30, as will be later explained, provide a means for circulating the cooling fluid through the current collector rings and the windings of the transformer.

The forward end of the pipe 24 is threadably received in the supporting shaft 22 and is in communication with radially extending passageways 31 in the shaft 22 which are disposed forwardly of the passageways 30. The supporting shaft is of increased diameter adjacent the radial passageways 31 to define a pair of longitudinally spaced annular flanges 32 and 33. Adjacent the forwardly disposed flange 33 the supporting shaft 22 is machined to provide a plurality of longitudinally extending and circumferentially spaced grooves 34 which form a portion of the cooling means for the high frequency rotary welding transformer of the present invention. The grooves 34 communicate with a longitudinally extending offset passageway 35 in the forward end of the supporting shaft 22 by means of a radial bore 36. The extreme forward end of the supporting shaft 22 is also provided with a plurality of longitudinally extending and circumferentially spaced groves 37. The grooves 37 extend rearwardly toward the forward end of the grooves 34 but a portion 38 of the supporting shaft 22 separates these grooves from each other.

Mounted on the supporting shaft 22 between the rearwardly disposed shoulder 32 and a large locking nut 39 threadably received on the supporting shaft adjacent the rear end thereof are a pair of elongated tubular spacers 40 and 41. The locking nut 39 is insulated from the spacer 41 and rigidly clamped between the spacers 40 and 41 is a current collector assembly generally designated by reference 42. The current collector assembly comprises a pair of current conductive collector rings 43 and 44 which are axially aligned and separated from each other by an annular insulating separator 45. Each of the current conductive collector rings 43 and 44 is mounted on an annular mounting member 46 as is clearly shown in the drawing. The arrangement is such that the mounting members 46, current collector rings 43 and 44 and the insulating separator 45 provide a very compact and rigid current collector assembly which is supported from and adapted to rotate with the supporting shaft 22.

The insulating separator 45 is provided with four radially extending and normally disposed passageways 49 and these passageways communicate with the radial passageways 30 in the supporting shaft 22. The outer ends of the passageways 49 are blocked and suitable longitudinally extending through apertures 50 adjacent the outer ends of the passageways 49 allow the fluid in the passageways 49 to spill into annular grooves 51 machined in the adjacent faces of the current conductive collector rings 43 and 44. The grooves in the collector rings 43 and 44 are generally L-shaped in cross section and provide a means for cooling these current collector rings.

The current collector ring 44 is provided with a threaded bore 52 along a major diameter thereof which communicates with the groove 51 therein. A second threaded bore 53 in the current collector ring 44 also communicates with the groove 51 therein and it will be noted that this last mentioned threaded bore is disposed approximately one hundred and ten degrees about the circumference of the current collector ring 44 from the threaded bore 52. A threaded bore 54 is also provided in the current collector ring 43 and is disposed to one side of the vertical diameter of this collector ring when the same is in the position shown in FIGURE 7 of the drawing. These threaded bores are employed to receive current and/or cooling fluid conduits in a manner to be hereinafter more fully explained.

The insulating separator 49 and the mounting members 46 are bored at 55 as shown in FIGURE 7 to provide for the passage of a current and cooling fluid conduit. It will be noted that a plurality of annular O-ring type of seals are provided between the insulating separator 45, the current collector rings 43 and 44 and the mounting members 46 to prevent leakage of the cooling fluid.

In the operation of the apparatus the high frequency alternating currents are transferred to the current collector rings 43 and 44 by a brush assembly generally designated by the reference numeral 60. The brush assembly comprises a pair of longitudinally spaced arcuate side members 61 which are rigidly attached to the opposite side faces of an arcuate spacer 62. The side members 61 and the brush spacer 62 define a generally U-shaped housing which nests with respect to a portion of the current collector ring assembly 42.

Attached to the outer face of each of the arcuate side members 61 is a downwardly depending brush mounting bracket 63 which has a relatively large circular opening at the lower end thereof. Received within the opening of the brush mounting bracket 63 is a generally tubular T-shaped brush holder 64 whose enlarged end is closed by a cover cap 65. Slidably received within the internal bore of the T-shaped brush holder 64 is a cup-shaped brush 66 whose face is urged by a compression spring 67 into tight pressure engagement with the adjacent side face of the associated current collector ring. It is preferred that cooling means, including the conduits 68 and 69, be incorporated for circulating cooling fluid within the tubular T-shaped brush holder 64 and the cup-shaped brush 66 to cool these members. The brush 66 is connected by suitable leads, which may be the current conductive cooling fluid conduit 68, to one terminal of a high frequency alternating current source, not shown. The brush assembly comprises a pair of the cup-shaped brushes 66 which each engage one of the current collector rings and it is, of course, necessary to insulate the brushes 66 from each other. To this end the brush spacer 62 and the side members 61 are formed from insulating material while the brush mounting brackets 63, T-shaped brush holders 64, cover caps 65, cup-shaped brushes 66 and springs 67 are fabricated from highly current conductive material.

It will be noted that the current conductive brushes 66 engage the outer side edges of the current collector rings 43 and 44 rather than the peripheral and circumferential edges of these members as has been customary in the prior art. As will be understood, the skin effect is observed at higher frequencies whereby the current is limited primarily to the surface of the conductor. By employing the brush assembly 60 and the current collector ring assembly 42 herein disclosed relatively large contact areas are provided between the current conductive brushes 66 and the current collector rings 43 and 44. Also, the high frequency alternating current is transferred into the current collector rings in such a manner that these alternating currents are dispersed across the entire outer radial surfaces thereof. The disclosed construction is such that resistance and reactance losses are maintained at an absolute minimum when transferring high frequency alternating currents from a source thereof to the rotary welding transformer.

As intimated above each of the cup-shaped brushes 66 is connected to one terminal of a source of high frequency alternating current. Various high frequency generators are commercially available, such as rotating generators, spark gap type generator and vacuum tube oscillators, for example, and any type of generator which serves as a source of high frequency current for powering the welding transformer may be employed.

Positioned on the supporting shaft 22 in concentric relation therewith is an elongated cup-shaped inner housing 72 which forms a portion of the secondary circuit for the rotary high frequency welding transformer as will be apparent. The cup-shaped inner housing 72 has an elongated forward end portion 73 which is tightly received in concentric relation about the forward end portion of the supporting shaft and cooperates with the grooves 34 and 37 in this supporting shaft to define a plurality of longitudinally extending and circumferentially spaced fluid passageways. The cup-shaped inner housing 72 also has an enlarged head portion 74 which encircles the enlarged portion of the supporting shaft in radially spaced relation with respect thereto. The spacing between the supporting shaft 22 and the enlarged head portion 74 of the cup-shaped inner housing 72 provides an elongated annular passageway 75 which is in communication with the radial passageways 31 and the longitudinally extending grooves 34 disposed about the circumference of the supporting shaft 22.

A second or outer cup-shaped housing 77 is positioned on the shaft 22 in insulated relation with respect thereto and with respect to the inner housing 74. The outer housing 77 comprises an elongated forward end portion 78 and an enlarged head portion 79. The internal diameter of the elongated forward end portion 78 of the outer housing 77 is considerably larger than the outer diameter of the elongated forward end portion 73 of the inner housing 72 to define an annular passageway 80 extending longitudinally therebetween. The passageway 80 is adapted to communicate with the grooves 37 formed in the forward end of the supporting shaft 22 by means of radial bores 81 in the forward end portion of the inner housing 72. The outer periphery of the head portion 74 of the inner housing 72 is positioned substantially radially inward of the inner wall of the enlarged head portion 79 of the outer housing 77 to thus form an annular enclosure 82 for the reception of a primary winding 83 which is wrapped about an annular transformer core 84. The transformer core 84 comprises an annular center ring 130 of powered and sintered magnetic material which is spaced from the turns of the primary winding 83 by inner and outer insulating ring spacers 131 as shown in FIGURES 9 and 11 of the drawing. The ring spacers 131 each have a plurality of longitudinally extending and circumferentially spaced grooves 132 on the surface thereof adjacent the annular center ring to define passageways for the flow of cooling fluid. The left hand or open end of this annular enclosure 82 is sealed in a fluid tight manner by means of an annular cover plate 85. Circumferentially spaced bolts secure the cover plate 85 to flanges 86 and 87 which extend outwardly of the outer housing 77 and inwardly of the inner housing 72 in the manner shown. The two housings 72 and 77 and the cover plate 85 form a secondary loop about the primary winding 83 of the high frequency rotary welding transformer.

Included in the secondary circuit are, of course, the welding electrode wheels 15 and 16 which are electrically connected to the ends of the outer housing 77 and the inner housing 72, respectively, as will be explained. The inner welding wheel electrode 15 is supported upon a ring member 88 which is in turn supported directly on the supporting shaft 22 and axially engages a shoulder thereof. The ring member 88 is formed of highly conductive material and is preferably split to allow the application of suitable tangential pressure by bolts, not shown.

The outer welding electrode wheel 16 engages the rear surface of a split ring 90 which is supported on the forwardly projecting end of the inner housing 72. It will be noted that the outer housing 77 terminates at a point rearwardly of the inner housing 72. The current conductive split ring 90 is clamped to the inner housing 72 by suitable bolts, not shown.

Retaining the current conductive split rings 88 and 90 and the welding electrode wheels 15 and 16 in axially aligned and clamped relation are a plurality of circumferentially spaced insulating bolts 91 which extend axially through these members. Threadably received on the forward ends of the insulating bolts 91 are clamping nuts 92 and the threaded rear ends of the insulating bolts 91 are received in an annular clamping ring 93. Of course, suitable insulating rings and blocks, as well as necessary fluid seals, not particularly shown, are provided. The open forward end of the inner housing 72 is closed by a T-shaped annular cover member 95 and a bolt and nut assembly 96 which is threadably received in the end of the supporting shaft 22. In essence, the above arrangement is such that the outer housing 77 is very efficiently connected to the inner welding electrode wheel 15 while the inner housing 72 is electrically connected to the outer welding electrode wheel 16.

As shown in FIGURE 9 of the drawing, the primary winding 83 comprises a plurality of individual thick copper conductors 97 which are connected in parallel and which are wrapped in a single layer of spaced turns longitudinally about the annular transformer core 84. In the illustrated embodiment of the invention three conductors 97 are shown as being connected in parallel to define the primary winding 83. The two outermost of the conductors 97 are insulated—by wrapping the same in Teflon tape, for example—while the center conductor is bare and uninsulated. The two ends of the primary winding 83 terminate in terminal connectors 100 and, as will be observed in FIGURES 1, 8 and 9 of the drawing, the terminal connectors are disposed in vertical planes but are spaced longitudinally with respect to each other for reasons to be later explained. A ring of insulating material 101 is positioned between the annular cover plate 85 and the transformer core 84 to separate the terminal connectors 100 from each other. A similar ring of insulating material 103 is positioned between the forward end of the transformer core 84 and the outer housing 77. It will be noted that the primary winding 83, transformer core 84 and the insulating rings 101 and 103 are of such a configuration and so mounted within the annular enclosure 82 that the entire primary of the high frequency rotary welding transformer may be immersed in cooling fluid.

At relatively low frequencies the transformer core 84 may be fabricated from stampings of magnetic sheet material while at intermediate frequencies the transformer core may be formed from powdered and sintered magnetic material as shown in the drawing. At relatively high frequencies the transformer core 84 may comprise a nonmagnetic form upon which the primary winding 83 is wrapped. It should be clearly understood that the number of conductors comprising a turn, the size of the conductors, the number of turns, the spacing of the individual turns on the transformer core and the magnetic properties of the transformer core are design factors which will be selected in accordance with standard engineering principles as best adapted for the frequency at which the rotary welding transformer is to operate.

It is, of course, necessary to provide current conducting means for interconnecting the current collector rings 43 and 44 with the terminal connectors 100 of the primary winding 83 and such means will now be described. Threadably received within the bore 53 in the current collector ring 44 is a current conductive pipe fitting 106 which receives one end of a properly bent current conductive conduit 107. The conduit 107 extends forwardly and upwardly and terminates in a right angled pipe fitting 108. The pipe fitting 108 is received on the protruding rear end of a current conductive tubular conduit 109 whose flanged forward end 110 is connected to one of the terminal connectors 100 of the primary winding 83.

Surrounding the current conductive conduit 109 is an elongated tubular insulator 111 that is preferably formed from Teflon or other suitable insulating material. The tubular insulator 111 comprises a forward end portion 112 which terminates adjacent the flange 110 of the tubular conduit 109 and a rear end portion 113 which has an increased diameter and is provided, adjacent the rear end thereof, with a plurality of integral longitudinally spaced and radially projecting heat radiating fins 114. Disposed in concentric relation about the tubular conduit 109 and the tubular insulator 111 is a sleeve 115 which is formed of current conductive material. The forward end of the current conductive sleeve 115 is connected, by soldering, for example, to the other one of the terminal connectors 100 of the primary winding 83. The rear end of the current conductive sleeve 115 terminates at a point adjacent the forward one of the heat radiating fins 114 of the tubular insulator 111. It will be noted that the small diametered forward end portion 112 of the tubular insulator 111 and the current conductive sleeve 115 are so dimensioned that an annular passageway 117 is provided. The current conductive sleeve 115 is also provided with a threaded bore 118 adjacent the rear end thereof which communicates with the annular passageway 117.

Surrounding the current conductive sleeve 115 is a tubular member 119 of insulating material. It will be observed that the current conductive conduit 109 and the tubular insulator 112 extend through the cover plate 85, the center of the rear terminal connector 100 and the insulating ring 101 to the forward terminal connector 100 of the primary winding 83 and that a suitable fluid seal is provided between the tubular insulator 111 and the tubular conduit 109 adjacent the rear ends thereof. The current conductive sleeve 115 and the tubular insulating member 119 extend through a suitable aperture in the cover plate 85 but terminate adjacent the rear terminal connector 100 of the primary winding 83. The insulating ring 101 has suitable slots therein, not particularly shown, which allow the rear terminal connector 100 of the transformer winding 83 to project therethrough. A fluid seal is provided between the current conductive sleeve 115 and the tubular insulator 111 to the rear of the annular passageway 117 and a further fluid seal is provided between the cover plate 85 and the tubular insulating member 119.

Figure 8:
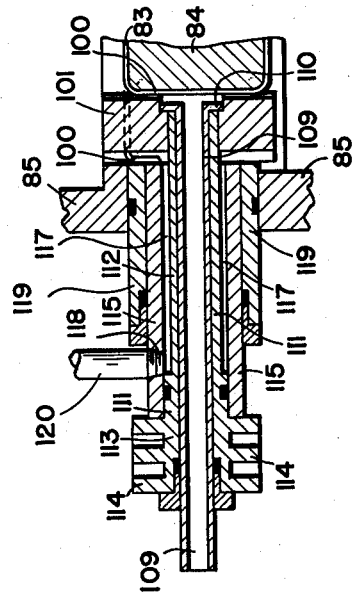
FIGURE 8 is an enlarged side sectional view showing the electrical connections between the current rings and the terminals of the primary winding of the welding transformer.
Figure 5:
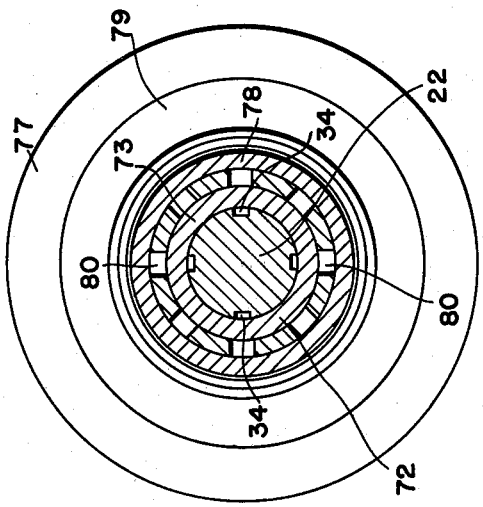
Figure 6:
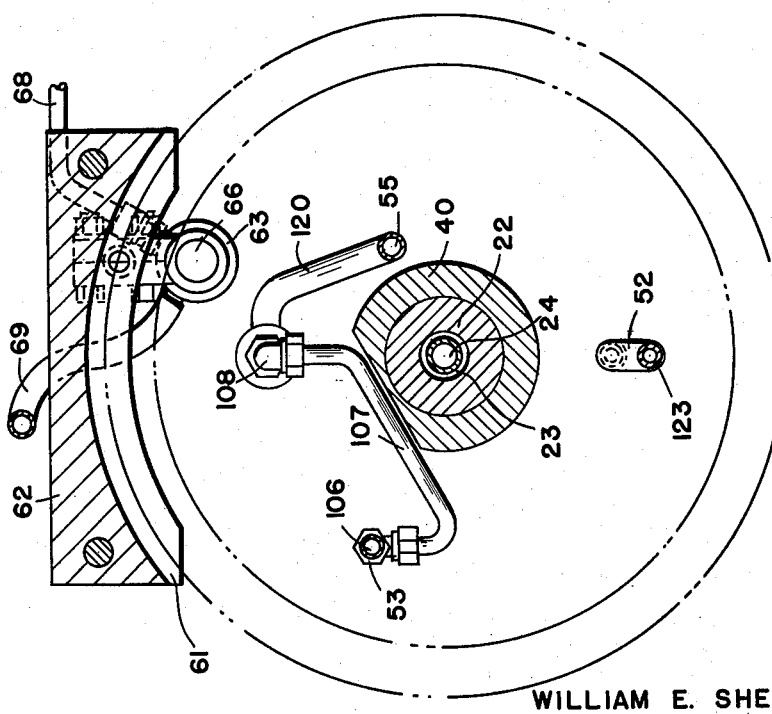

Received within the threaded bore 118 in the current conductive sleeve 115—said bore actually being disposed at an angle of ninety degrees from the location shown in FIGURE 8 of the drawing—is a tubular current conductive conduit 120 which extends downwardly and then longitudinally to the rear through the opening 55 in the mounting members 46 and the insulating separator 45. The tubular current conductive conduit 120 is then connected by suitable current conductive pipe fittings 121 into the threaded bore 54 in the current collector ring 43. The above described arrangement is such that the current collector ring 43 is in electrical contact with the rear terminal connector 100 while the other current collector ring 44 is in electrical communication with the forward terminal connector 100. It will be noted that the tubular conduit 109 and the current conductive sleeve 115 are disposed in concentric relation whereby the magnetic fields surrounding these conductors are eliminated. This arrangement substantially mitigates serious flash-over and high voltage insulation problems while yet the assembly is extremely small and compact.

As will be more fully apparent, cooling fluid is supplied to the annular enclosure 82 through the various conduits and passageways provided in the means for transferring the high frequency currents from the current collector rings to the transformer primary winding. The supply of cooling fluid to the annular enclosure 82 is augmented by a flexible and insulating conduit 123 extends from the threaded bore 52 in the current collector ring 44 to the annular enclosure 82 as is shown in FIGURE 2 of the drawing.

In the use of the apparatus above described, the welding electrode wheels 15 and 16 engage the opposite side edges of a cylindrical tube length while high frequency alternating currents at a relatively high voltage are supplied to the cup-shaped brushes 66 by means of the current conductive conduits 68. The brushes 66 transfer the high frequency currents to the current collector rings 43 and 44 in a continuous manner as the transformer is rotated about its axis. The brush assembly is operative to effect this transfer with a minimum of reactance and resistance loss.

The current collector ring 44 is connected to the forward terminal connector 100 of the primary winding 83 by the pipe fitting 106, conduit 107, fitting 108 and the tubular conduit 109 while the current collector ring 43 is connected to the rear terminal connector 100 by the pipe fittings 121, conduit 120 and the current conductive sleeve 115. As mentioned above, the disclosed means of interconnecting the terminal connectors 100 of the primary winding 83 and current collector rings is highly advantageous since the same is quite compact and since insulation and flash-over problems are minimized. This transfer of high frequency electrical currents also takes place with a minimum of resistance and reactance drop.

The high frequency alternating currents in the primary winding 83 induce a relatively low voltage and high amperage welding current at the desired frequency in the secondary loop. This secondary loop comprises the cover plate 85, inner housing 72, outer housing 77, the welding wheel electrodes 15 and 16 and the cylindrical tube length. It will be noted that the inner and outer housings are concentrically mounted throughout their lengths and this is particularly important in providing a relatively small and compact rotary welding transformer for ease of mounting and use while yet high voltage insulation problems are substantially eliminated. The entire secondary loop is characterized by its extreme simplicity and compactness.

Cooling fluid is, of course, circulated through the high frequency rotary welding transformer and this is accomplished by introducing fluid under pressure into the annular passageway defined by the axial bore 23 in the elongated shaft 22 and the pipe 24 through the inlet conduit 27 leading to the rotary fluid coupling 26. The fluid flows from this passageway into the radial passageways 30, into the passageways 49 in the insulating separator 45 and into the annular recesses 51 in the current collector rings 43 and 44. From the recess 51 in the current collector ring 43 the cooling fluid flows within the pipe fittings 121 and conduit 120 to the annular passageway 117 between the tubular insulator 111 and the current conductive sleeve 115 to the interior of the annular enclosure 82 defined by the inner and outer housing members. The cooling fluid in the annular groove 51 of the current collector ring 44 also is introduced into the annular enclosure 82 by means of the tubular conduits 107 and 109 and by the flexible conduit 123. It will be noted that the interior of the tubular conduit 109 and the current conductive ring member 115 are in intimate contact with the cooling fluid whereby the same are in highly efficient heat transfer relation therewith. The cooling fluid flows about the transformer core and through the grooves 132 in the insulating ring spacers 131 to very effectively cool the annular ring of magnetic material 130. The arrangement is such that the annular ring of magnetic material 130 is surrounded by cooling fluid.

From the forward end of the annular enclosure 82 the cooling fluid travels along the passageway 80, down through the radial passageway 81 in the forward end portion of the inner housing 72, along the passageways defined by the longitudinally extending and circumferentially spaced grooves 37 in the supporting shaft 22, about the forward end of the supporting shaft, into the longitudinally extending bore 35, outwardly through the radial passageways 36, along the circumferentially spaced and longitudinally extending grooves 34 in the supporting shaft, down through the radial passageways 31, through the pipe 24 and thence to the source through the outlet conduit 28 of the rotary fluid coupling. It will be noted that the concentric inner and outer housing of the secondary loop are also surrounded by concentric layers of cooling fluid whereby a highly efficient heat transfer means is provided. The various cooling passageways in the high frequency rotary welding transformer of the present invention are so disposed and of such a size that overheating of the transformer at any localized area is precluded even when the transformer is operated continuously for sustained periods. Of course, cooling fluid is also supplied to the brushes 66 of the brush assembly 60 by means of the conduits 68 and 69 during the operation of the high frequency rotary welding transformer.

It should thus be apparent that I have accomplished the objects initially set forth by providing a highly improved and extremely simplified rotary welding transformer which is ideally adapted for use with high frequency alternating currents. It should be understood that many changes may be made in the illustrated embodiment of the invention without departing from the clear teachings thereof. Accordingly, reference should be had to the following appended claims in determining the true scope and intent of the invention.

I claim:

1. A high frequency rotary welding transformer for tube mills and the like comprising a shaft having a pair of current-conductive sleeves thereon insulated from each other except at one end thereof to form a secondary loop, at least the outer sleeve adjacent said end being enlarged to form an annular space for the reception of an annular transformer core having a primary winding thereon, welding electrode wheels mounted on the other ends of said sleeves, a pair of insulated current-collector rings mounted on said shaft outwardly of but adjacent to the first mentioned end of said sleeves and electrically connected through current and fluid conductive conduits with the two end terminals of said primary winding, said rings being hollow whereby fluid supplied thereto may enter said conduits, and passage means in said shaft to supply cooling fluid to said collector rings.

2. An assembly according to claim 1 further characterized in that said conduits are openly connected with said annular space whereby cooling fluid flowing through said conduits from said collector rings may be discharged into said annular space and further including a fluid outlet for said annular space comprising passage means extending between said sleeves outwardly toward said wheels, and other passage means including openings in said shaft to conduct cooling fluid from adjacent said welding wheels axially back through said assembly beyond said collector rings.

3. A high frequency rotary welding transformer for tube mills and the like comprising a shaft mounting in its center portion a transformer having a primary winding and a secondary loop which is connected to a pair of welding electrode wheels mounted at one end of said shaft, a pair of hollow current collector rings mounted on said shaft at the axial end of said transformer opposite said wheels, means including passageways in said shaft to supply cooling fluid to said rings, and means comprising current and fluid conductive conduits interconnecting said rings with the terminals of the primary winding of said transformer.

4. An assembly according to claim 3 further characterized in that said rings are mounted in spaced parallel relation and have flat end faces, tubular brush holders positioned outwardly of said faces and having their axes directed toward said faces, said tubular holders being closed at their outer ends and each slidably mounting a piston-like brush which engage said faces, and means to conduct cooling fluid into said tubular holders outwardly of said brushes.

5. A rotary welding transformer of the type adapted for use with high frequency alternating currents in the welding of the adjacent side edges of a tube length which comprises an elongated and centrally disposed main supporting shaft, a pair of welding electrode wheels mounted adjacent one end of said supporting shaft, said welding electrode wheels being disposed in radial planes and being axially insulated from each other, a primary winding, said primary winding being mounted from said supporting shaft intermediate the ends thereof, a secondary loop interconnecting said welding electrode wheels and said primary winding, said secondary loop comprising an inner elongated cylindrical housing mounted concentrically on said supporting shaft between said primary winding and said welding electrode wheels, an outer elongated cylindrical housing, said outer housing having a larger diameter than said inner housing and being mounted concentrically about said main supporting shaft and said inner housing in insulated relation with respect to said inner housing between said primary winding and said welding electrode wheels, said inner and outer housings being current conductive to define concentric conductors, means to circulate cooling fluid about said inner and outer housings, said means to circulate comprising a plurality of longitudinally extending and circumferentially spaced grooves in the periphery of said supporting shaft, a plurality of circumferentially spaced and longitudinally extending passageways disposed within said inner and said outer housings, and means interconnecting said passageways and said grooves.

6. A rotary welding transformer of the type adapted for use with high frequency alternating currents in the welding of the adjacent side edges of a tube length which comprises an elongated and centrally disposed main supporting shaft, a pair of welding electrode wheels mounted on said shaft, a primary winding mounted on said shaft, a secondary loop interconnecting said primary winding and said welding electrode wheels, said secondary loop comprising an inner cylindrical housing mounted concentrically on said supporting shaft, an outer cylindrical housing mounted concentrically about said supporting shaft and said inner housing and being insulated from said inner housing, said inner and outer housings being current conductive to define concentric conductors, means to circulate cooling fluid about said inner and said outer housings, said means to circulate comprising a first set of longitudinally extending and circumferentially spaced passageways disposed between said supporting shaft and said inner housing, a second set of longitudinally extending and circumferentially spaced passageways disposed between said inner and said outer housings, means interconnecting said passageways, said means interconnecting said passageways comprising a third set of longitudinally extending and circumferentially spaced passageways disposed between said supporting shaft and said inner housing and longitudinally of said first set of passageways, a radial bore in said inner housing interconnecting said second and said third set of passageways, a longitudinally extending bore in said supporting shaft, and a radial bore in said supporting shaft interconnecting said longitudinally extending and said first set of passageways.

7. A rotary welding transformer of the type adapted for use with high frequency alternating currents in the welding of the adjacent side edges of a tube length which comprises an elongated and centrally disposed main supporting shaft, a pair of welding electrode wheels mounted on said shaft, a primary winding mounted on said shaft, a secondary loop interconnecting said primary winding and said welding electrode wheels, said secondary loop comprising an inner cylindrical housing mounted concentrically on said supporting shaft, an outer cylindrical housing mounted concentrically about said supporting shaft and said inner housing and being insulated from said inner housing, said inner housing and outer housings being current conductive to define concentric conductors, means to circulate cooling fluid about said inner and said outer housings, said means to circulate comprising a first set of longitudinally extending and circumferentially spaced passageways disposed between said inner and said outer housings, means interconnecting said passageways, said first set of passageways being defined by a plurality of longitudinally extending and circumferentially spaced grooves formed in said supporting shaft.

8. A rotary welding transformer of the type adapted for use with high frequency alternating currents in the welding of the adjacent side edges of a tube length which comprises an elongated main supporting shaft, a pair of welding electrode wheels mounted on said supporting shaft, a primary winding having a pair of terminal connectors mounted on said supporting shaft, a secondary loop interconnecting said primary winding and said welding electrode wheels, means to transfer alternating currents from a source thereof to said terminal connectors of said primary winding, said last mentioned means comprising a pair of current collector rings, an insulating spacer, said current collector rings and said insulating spacer being mounted on said supporting shaft in axially aligned relation with said insulating spacer being disposed between said current collector rings, means connecting each of said current collector rings with one of said terminal connectors, means to circulate cooling fluid through said current collector rings and said insulating spacer, said last mentioned means comprising an axial bore in said supporting shaft, a plurality of radial passageways in said insulating spacer, radial passageways in said supporting shaft interconnecting said radial passageways in said insulating spacer and said axial bore in said supporting shaft, annular grooves in the adjacent radial faces of said current collector rings, and passageways interconnecting said radial bores in said insulating spacer and said annular grooves in said current collector rings.

9. A rotary welding transformer of the type adapted for use with high frequency alternating currents in the welding of the adjacent edges of a tube length which comprises a primary winding having a pair of concentric but spaced terminal connectors, a secondary loop, means to transfer alternating currents from a source thereof to said terminal connections of said primary winding, said means to transfer comprising a pair of insulated concentric conductors, said pair of insulated concentric conductors comprising a tubular conduit of current conductive material passing through one of said connectors and electrically connected to the other of said connectors, a tubular insulator mounted in concentric relation on said tubular conduit, a current conductive annular member mounted in concentric relation about said tubular conduit and said tubular insulator and connected to said other terminal connector; and an insulating sleeve surrounding said current conductive annular member in concentric relation with respect to said tubular conduit, said tubular insulator, and said current conductive annular member.

10. Apparatus according to claim 9 further characterized in that said primary winding is mounted in an annular enclosure having a back cover plate, a ring of insulating material disposed between said primary winding and said back cover plate, said terminal connectors of said primary winding being disposed in vertical but longitudinal spaced planes, one of said terminal connectors being positioned between said back cover plate and said ring of insulating material, the other of said terminal connectors being positioned between said primary winding and said ring of insulating material, said tubular conduit and said tubular insulator extending through said back cover plate and said ring of insulating material, said tubular conduit being connected to said other terminal connector, said current conductive annular member and said insulating sleeve extending through said back cover plate, and said current conductive annular member being connected to said one terminal connector.

11. A high frequency rotary welding transformer for tube mills and the like comprising an annular current-conductive casing having inner and outer concentric walls interconnected at one end to define a secondary current loop and an annular space for reception of a core and primary structure, said core comprising an annulus of magnetic material, and a layer of a heavy current conductor wound spirally on said annulus, a hollow co-axial current-conductive connector extending outwardly of said annular space and connected at its inner end to the end terminals of said conductor forming the primary winding, means to connect high frequency alternating current to the co-axial conductors of said connector, and means to circulate cooling fluid through said connector.

12. Apparatus for supplying high frequency resistance welding current in the manufacture of metal tubes characterized in that a transformer having annular nested primary and secondary circuits is carried on a rotatable shaft and a pair of insulated current-collecting rings are mounted on said shaft adjacent one end of the transformer while a pair of adjacent parallel insulated wheel electrodes are also mounted on said shaft at the opposite end of said transformer and electrically connected to the secondary circuit thereof, co-axial tubular members connected to the terminals of the primary circuit of said transformer and extending outwardly of said one end of said transformer and electrically connected to said rings whereby electrical energy of high frequency is supplied to said primary circuit, said rings being hollow and being supplied by cooling fluid by passage means in said shaft, and the means electrically connecting said rings to said co-axial tubular members being hollow to permit the flow of cooling fluid from said rings through said co-axial members and into the space surrounding said primary circuit.

References Cited in the file of this patent

UNITED STATES PATENTS

| | | |
|---|---|---|
| 1,394,901 | Hobart | Oct. 25, 1921 |
| 1,469,720 | Dorsey | Oct. 2, 1923 |
| 2,265,627 | Caputo | Dec. 9, 1941 |
| 2,561,739 | Hunter | July 24, 1951 |
| 2,666,121 | Allardt | Jan. 12, 1954 |
| 2,790,100 | Caputo et al. | Apr. 23, 1957 |
| 2,964,610 | Mackey | Dec. 13, 1960 |